United States Patent [19]
Grewe

[11] Patent Number: 6,037,672
[45] Date of Patent: Mar. 14, 2000

[54] GENERATOR HAVING IMPEDANCE MATCHING PRIME MOVER OUTPUT CAPABILITY FOR OPERATION WITH MAXIMIZED EFFICIENCY

[75] Inventor: Timothy Michael Grewe, Endicott, N.Y.

[73] Assignee: LockHeed Martin Corporation, Johnson City, N.Y.

[21] Appl. No.: 09/020,516

[22] Filed: Feb. 9, 1998

[51] Int. Cl.[7] ............................... F02N 11/06; H02P 9/04
[52] U.S. Cl. .................. 290/40 A; 290/40 B; 290/40 C; 290/40 D; 290/40 F; 290/40 R; 290/51
[58] Field of Search ................ 290/40 A–40 F; 322/10, 29, 31

[56] References Cited

U.S. PATENT DOCUMENTS

| | | | |
|---|---|---|---|
| 4,165,795 | 8/1979 | Lynch et al. | 180/65 A |
| 4,246,531 | 1/1981 | Jordan | 322/28 |
| 5,053,662 | 10/1991 | Richter | 310/90.5 |
| 5,703,410 | 12/1997 | Maekawa | 290/40 C |
| 5,747,971 | 5/1998 | Rozman et al. | 322/10 |

*Primary Examiner*—Elvin Enad
*Attorney, Agent, or Firm*—Geoffrey H. Krauss

[57] ABSTRACT

In an electrical power generation unit with a prime mover having an output shaft rotating at a speed $\omega$ which determines an output power function having at each value of $\omega$ an output-power/$\omega$ slope $M_d$, and a generator developing electrical power responsive to shaft rotation, a generator electrical impedance is selected to provide a generator output-power/$\omega$ slope $M_g$ to approximate the $M_d$ slope, so that $\omega$ can be controlled to maximize efficiency.

17 Claims, 2 Drawing Sheets

GENERATOR HAVING IMPEDANCE MATCHING PRIME MOVER OUTPUT CAPABILITY FOR OPERATION WITH MAXIMIZED EFFICIENCY

The present application relates to prime-mover-driven electrical generators and, more particularly, to a novel generator having an internal impedance selected to match the output drive capability of the prime mover throughout the mover's speed range to obtain maximum efficiency and minimum emissions.

BACKGROUND OF THE INVENTION

It is well known to drive an electrical generator with a prime mover attached to the rotor shaft of the generator. Typically, the generator electrical output is provided responsive to the excitation of a field coil in the generator; the field coil itself and the separate field excitation electronics are both costly and undesirable. Further, use of excited field coils will often cause the generator to operate at reduced efficiency. This is normally undesirable, and is especially so when the combination of prime mover and electrical generator is contained in an electric vehicle, where the wheels are driven by a motor receiving power provided either directly or indirectly from the generator; maximization of efficiency will not only improve fuel consumption, but may also result in minimization of pollution and other undesirable characteristics.

It is therefore desirable to provide a permanent magnet generator, devoid of field coil and field excitation means, which is driven, with maximized efficiency, directly by the prime-mover.

BRIEF SUMMARY OF THE INVENTION

In accordance with the invention, a prime mover has an output shaft, whose rotation at a speed $\omega$ determines an output power function having at each value of $\omega$ an output-power/$\omega$ slope $M_d$, and is coupled to a generator for development of electrical power responsive to rotation of that output shaft, then a generator electrical impedance is selected to have a generator output-power/$\omega$ slope $M_g$ to approximate the $M_d$ slope, to facilitate maximization of efficiency.

In a presently preferred embodiment, the generator slope is within a factor of two of the prime mover slope. As used in a hybrid electrical vehicle having a prime-mover diesel engine with an operating curve slope $M_d$ on the order of 0.15 hp/rev., the generator electrical impedance Z is selected to yield an operating curve slope $M_g$ of between about 0.075 hp/rev. and about 0.3 hp/rev.

Accordingly, it is one object of the present invention to provide an engine-driven electrical generator having an impedance selected to match the operational characteristics of the generator to those of the driving engine and maximize efficiency thereby.

This and other objects of the present invention will become apparent to those skilled in the art upon consideration of the following detailed description, when read in conjunction with the appended drawings, in which like elements are designated by like reference designations.

BRIEF DESCRIPTION OF THE DRAWINGS

FIG. 1 is a schematic block diagram of an engine-driven generator and of a typical load thereon, as may be found in a hybrid electrical vehicle and the like;

DETAILED DESCRIPTION OF A PREFERRED EMBODIMENT

Figure 1:
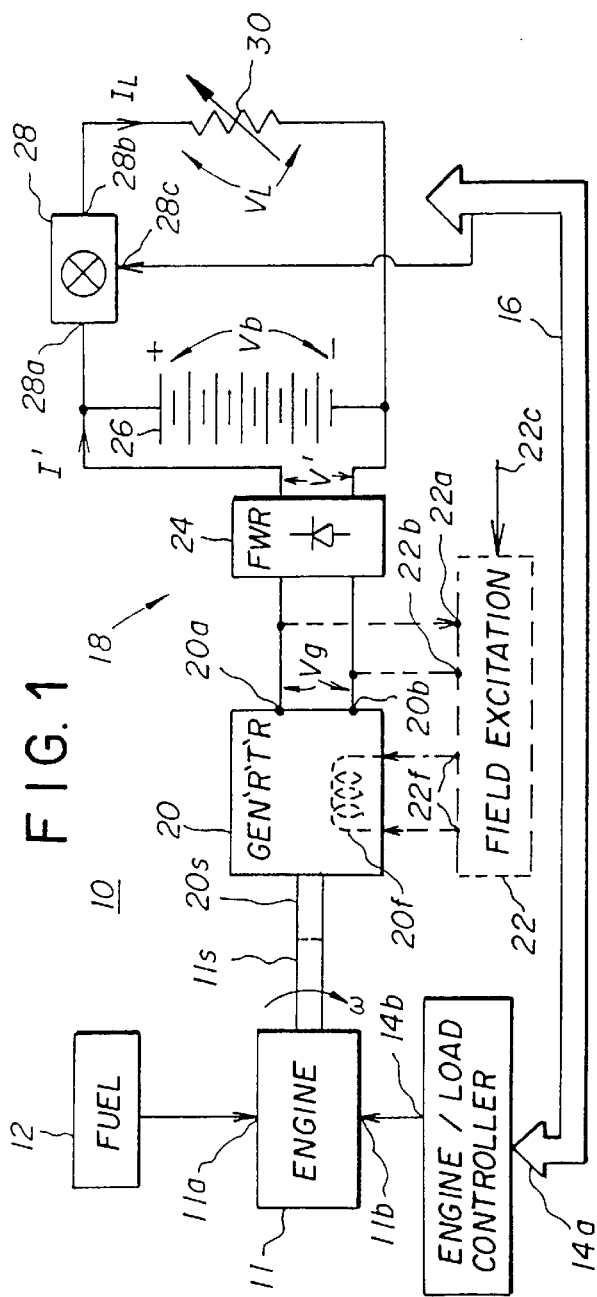

Referring initially to FIG. 1, a system 10, such as the motive system for a hybrid electric vehicle and the like, utilizes an engine 11 as a prime mover. A source of fuel 12 is connected to a fuel input 11a of the engine, which fuel is combusted in the engine to cause an output shaft 11s to turn at a rotational speed, or frequency, $\omega$. The rotational speed $\omega$ of engine shaft 11s is set responsive to signals provided at an engine control input 11b from an output 14b of an engine/load controller means 14. Means 14 has at least one input/output port 14a connected to receive and transmit electrical signals over an electrical wiring bus 16 to and from a generator load means 18, which may contain sensors, switches and the like transducers and/or effectors coupled to at least one end-effector means, such as the wheel-driving motor in a hybrid electrical vehicle and the like.

Engine shaft 11s is directly connected to a rotor shaft 20s of a generator means 20 for producing an AC output voltage $V_g$ between generator output terminals 20a and 20b, for connection to load 18. Generally, generator 20 has heretofore been of the excited field type, having a field coil 20f (shown in phantom line) within the generator and connected to a field excitation output 22f of a field excitation means 22. Means 22 would typically have inputs 22a/22b connected to the generator electrical output, for monitoring the AC voltage therefrom, and also have a control input port 22c for receiving commands, other sensed parameters and the like signals, so that the totality of input signals could be utilized, in manner well known to the electrical generating arts, to set the generator voltage $V_g$ by controlling the field coil 20f excitation signal characteristics. In accordance with one aspect of the present invention, generator 20 is a permanent magnet type, completely devoid of an excitation coil 20f, and the system 10 is similarly completely devoid of any form of field excitation means 22, and any special sensors, actuators and electrical connections associated with such a field excitation means.

An exemplary generator load 18, as might be found in a hybrid electric vehicle and the like, might include a full wave rectifier (FWR) means 24 for receiving the AC voltage $V_g$ from generator terminals 20a and 20b, for rectification into a pulsatile-DC voltage V' appearing across a storage battery 26. A controlled-switching means 28 is connected in series with a variable load 30, such as a DC electric motor and the like, across battery means 26. The series combination of means 28 and means 30 is thus connected in parallel with the battery means 26, and across the output of FWR means 24. The electrical potential at controlled-switching means input 28a is selectively coupled to its output 28b (and thence to load 30) responsive to the state of a control signal at an input 28c, which signal is typically provided via bus 16 and the like.

Figure 2:
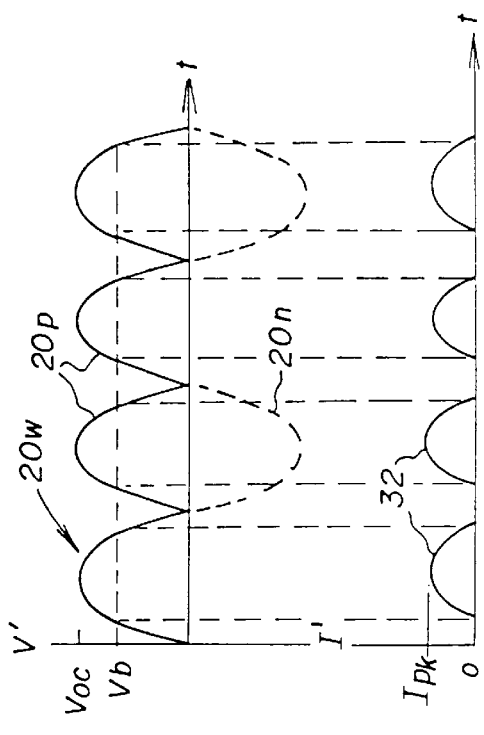
FIG. 2 is a set of coordinated graphs illustrating the voltage and current provided by the engine-driven, impedance-matched generator of the present invention.

Referring now also to FIG. 2, the generator voltage $V_g$ is always a bipolar AC voltage 20w of some peak value (which will have a maximum value of $V_{oc}$, the generator open-circuit voltage, and will typically be of somewhat lesser magnitude, due to the voltage drop caused by generator current flow through a generator series impedance Z). In the output voltage V' of means 24, the negative-polarity half cycles 20n (shown in broken line) are inverted by the full wave rectification process; the uni-polar voltage V' has only positive-polarity lobes 20p. Current I' does not flow when the rectifier diodes of means 24 are reverse-biased, which occurs whenever the instantaneous magnitude of voltage V' is less than the voltage $V_b$ of battery means 26 connected across the FWR means output. However, as soon as voltage V' instantaneously is of value greater than battery voltage $V_b$, diodes of FWR means 24 become forward biased and pulses 32 of current I' flow, as shown in the lower waveform in FIG. 2, to some peak value $I_p$. If switch means 28 is non-conductive, all of current I' charges and recharges battery 26; if switching means 28 is conductive, current flows from either or both of means 24 or battery 26, through means 28 and into electrical load 30.

Figure 3:
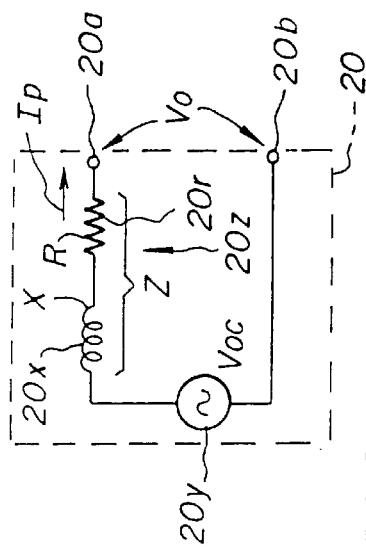
FIG. 3 is the Thevenin-equivalent circuit of the novel matched generator of the present invention.

Permanent magnet generator (PMG) means 20 has a Thevenin-equivalent circuit as shown in FIG. 3, with a sinusoidal source 20y having a value $V_{oc}$ (which is a function of the generator input shaft 20s rotational speed $\omega$) in series, between generator terminals 20a and 20b, with a generator impedance 20z consisting of a series resistance 20r and a series reactance 20x. In accordance with one aspect of the present invention, the value Z of generator impedance 20z is selected to set a particular operating slope $M_g$, which is defined as the change of power P (in horsepower) with respect of shaft speed S (in rev. per minute), and desirably matches the slope $M_d$ of the engine P/S curve, as will be discussed in detail hereinbelow. Slope $M_g$ may be set by manipulation of the resistive component magnitude R and/or the reactive component magnitude X.

Figure 4:
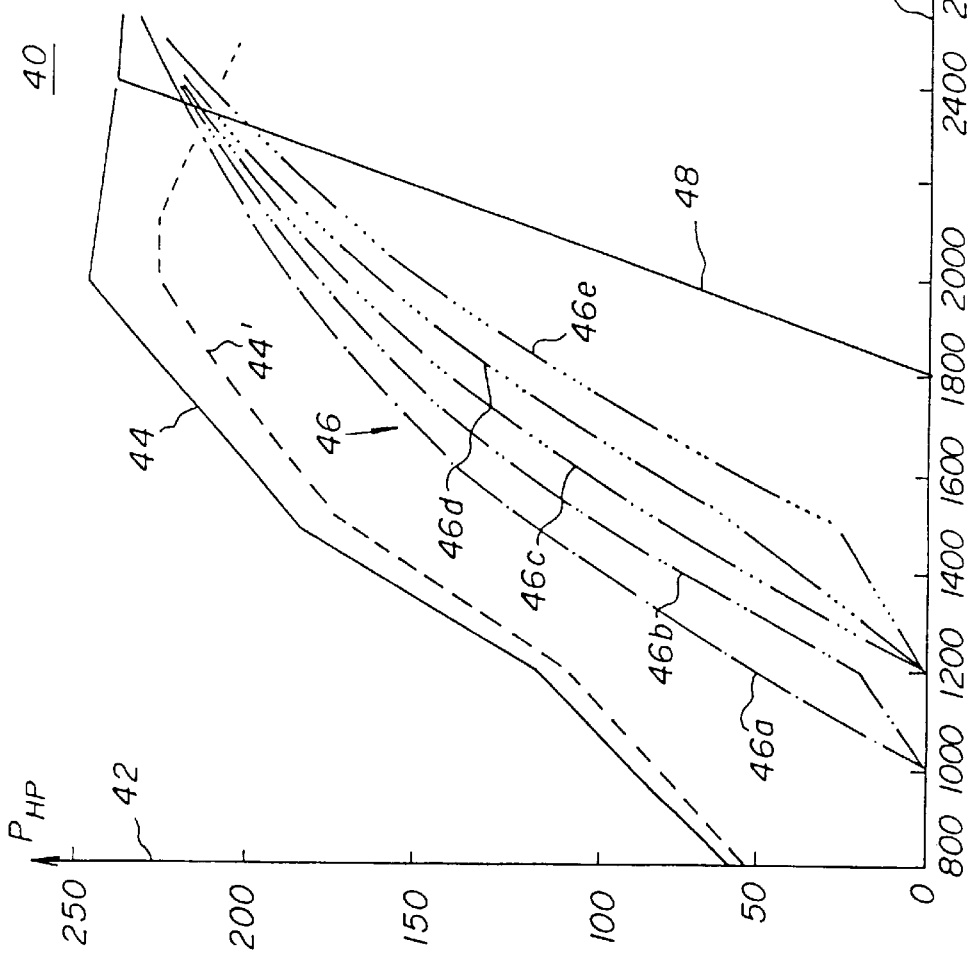
FIG. 4 is a graph illustrating: the maximum and net power curves of a particular diesel engine; the operating curve of a prior-art unmatched generator; and a set of operating curves for a novel matched generator in accordance with the present invention.

Referring now to FIG. 4, graph 40 has the rotational speed S of engine 11, in revolutions per minute (rpm), plotted along abscissa 41, and engine power output P, in horsepower, plotted along ordinate 42. For a particular diesel engine 11 both a maximum power $P_{max}$ curve 44 and, with a known coupling between the engine and its shaft load, a net power $P_{net}$ curve 44', can be obtained. Curve 44' closely tracks curve 44; for this particular engine, power versus speed curve 44 has a slope $M_d$ of about (240–60) hp/(2000–800) rpm=0.15 hp/rev. The generator 20 has an operating curve 46 which is determined by its output voltage $V_g$, itself being equal, when rectified, to the battery voltage $V_b$; thus, the generator has a first operating curve 46a of output power vs. speed S of shaft 20s, for a lower limit battery voltage (here, about 450 Vdc), and has other operating curves 46b, 46c, 46d and 46e, respectively, for greater values $V_b$ (here, of about 500, 540, 580 and 620 Vdc, respectively).

In accordance with the invention, the generator impedance Z is selected to cause a generator operating curve 46 to have a slope $M_g$ approximating the engine operating slope $M_d$. Typically, the generator curve 46 slope $M_g$ for any speed S will be related to the engine curve 44 slope $M_d$ at the same speed by no more than a factor of two, e.g. a minimum generator operating curve slope $M_{g,min}$ of approximately $M_d/2$ and a maximum generator operating curve slope $M_{d,max}$ of approximately $2M_d$. Illustratively, for an engine having an $M_d$ of 0.15, the minimum generator curve 46 slope will be about 0.075 (as at the upper end of curve 45a) and the maximum generator slope $M_g$ will be about 0.3 (as at the lower end of curve 46e). In hitherto known engine-generator combinations, the traditional generator operating curve 48 has had a typical slope $M_{old}$ of about 0.4 horsepower per revolution. It will be seen that a matched engine-generator pair, in accordance with the present invention, will have an operating curve slope less than the operating slope of a traditional generator and typically two or three times less than the traditional generator slope.

For one particular combination of a 240 peak horsepower diesel engine and a permanent-magnet generator 20 providing output power at AC peak voltages between about 450 volts and about 620 volts, it will be seen that the generator 20 is selected not only for an impedance match to the prime mover, but also to cause the generator to provide substantially no output power for rotational speeds below about 1,000 rpm; appreciable electrical power, which may be defined as more than about 5% of peak power, is thus only provided at speeds selected to be above the slow-speed region where higher emissions and other undesirable characteristics are encountered for the particular engine used.

In accordance with another aspect of the invention, having appreciable generator power output commence at shaft speeds between 1,000 and 1,200 rpm allows minimized engine emissions while still not placing a load upon the diesel engine 11 until the diesel turbo has sufficiently ramped up in speed so as not to reduce the total diesel operating speed; this also allows the fuel injection system of the diesel engine to be adjusted to gradually ramp the engine to about 1,200 rpm prior to increasing fuel flow to meet low end torque requirements and thus further reduce gaseous and particulate emissions from engine 11.

Figure 5:
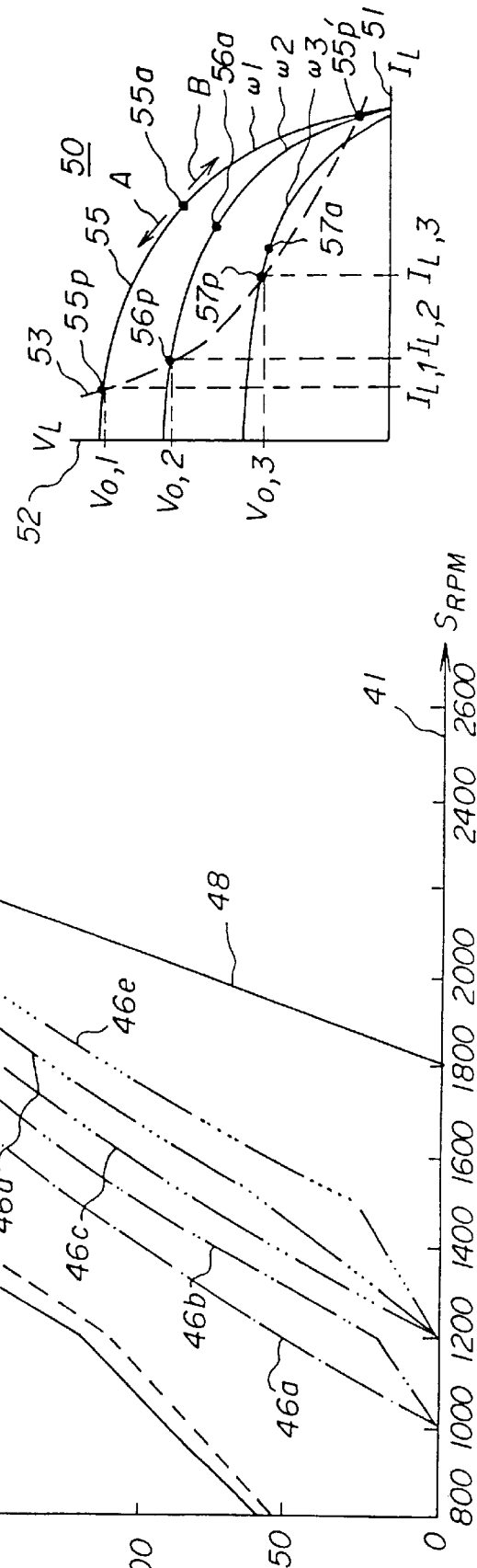
FIG. 5 is a graph illustrating set of voltage-current operating curves, and a constant load-power curve for one particular operational scenario, illustrating the manner in which the prime mover-generator efficiency is maximized in accordance with the principles of the present invention.

Referring finally to FIG. 5, a graph 50 has load current $I_L$ plotted along abscissa 51 and load voltage $V_L$ plotted along ordinate 52. The load (motor 30) is a constant power load having a V-I curve 53 shown in broken line. This curve is the power delivered to the load motor and is the product of an operating voltage, approximately equal to the generator voltage $V_g$, multiplied by the operating current at any point on curve 53. At a set speed, generator 20 will operate along a generator power curve producing a power determined by the battery system voltage point $V_b$. For the purpose of illustration, assume a first operating speed generator power curve given by solid line curve 55. This curve will be for a higher speed (e.g. say 2,000 rpm) than the middle speed (say 1,800 rpm) of a second curve 56, which will still be higher than the lower speed of a third operating curve 57 (at say 1,600 rpm). If the power demand from the generator is significantly lower than the generator capacity at the given speed, say 2,000 rpm along curve 55, the current I will naturally decrease causing the system to operate at a less efficient point. On curve 55, maximum efficiency is obtained at point 55a, with increasing rotor losses occurring in direction of arrow A and increasing $I^2R$ losses occurring in the direction of arrow B. The only possible operating points are where curves 53 and 55 cross, at points 55p and 55p'; the relatively high generator voltage will normally dictate operation at point 55p, with much less than maximum efficiency for that generator curve 55. Controller 14 recognizes the operation at voltage $V_{o,1}$ and current $I_{L,1}$, well removed from point 55a, and adjusts the speed of the diesel engine 11, e.g. decreasing the speed, in order to increase generator efficiency. At some time later, the generator speed has fallen until generator 20 is operating along generator curve 56. The exact operating point will be point 56p, where curves 53 and 56 intersect. Operating point 56p is still fairly far removed from the maximum efficiency operating point 56a of the generator at this new speed. Accordingly, controller means 14 continues to reduce the engine speed until a speed is reached producing curve 57, where the generator is operating at point 57p, very close to the maximum operating efficiency point 57a. It has been found that a minimum efficiency of about 94% can be obtained by matching the generator impedance Z to the engine rotating the generator shaft, as opposed to a typical 85% efficiency of generators having operating curves such as curve 48.

While the present invention has been described with respect to one presently preferred embodiment thereof, many variations and modifications will now become apparent to those skilled in the art. It is my intent, therefore, to be limited only by the scope of the appended claims, and not by way of details and instrumentalities presented herein by way of description.

What is claimed is:

1. Apparatus for generating electrical power, comprising:

prime mover means having an output shaft rotating at a speed S determining a prime mover output-power-versus-speed curve having at each value of speed S an output-power/S slope $M_d$; and generator means for providing electrical power responsive to rotation of said shaft and with an impedance selected to cause a generator output-power-versus-speed curve to have a slope $M_g$ at that S value to approximate said $M_d$ slope within a factor of about two.

2. The apparatus of claim 1, further comprising means for controlling the speed of shaft rotation to maximize the efficiency of the apparatus.

3. The apparatus of claim 1, wherein the generator impedance provides an operating curve slope $M_g$ not less than about one-half of the slope $M_d$.

4. The apparatus of claim 1, wherein said generator means provides a lower power output, less than about 10% of a generator maximum power output, for a rotational speed S less than about 1500 rpm.

5. The apparatus of claim 4, wherein no generator power output is provided for a rotational speed S less than about 1000 rpm.

6. The apparatus of claim 1, wherein said prime mover means is a hydrocarbon fuel-burning engine.

7. The apparatus of claim 6, wherein said engine is a turbo-diesel engine in a hybrid electric vehicle.

8. A method for generating electrical power, comprising the steps of:

(a) providing a prime mover having an output shaft rotating at a speed S determining a prime mover output-power-versus-speed curve having at each value of speed S an output-power/S slope $M_d$;

(b) providing a generator developing electrical power responsive to rotation of the output shaft; and (c) selecting a generator impedance to cause a generator output-power-versus-speed curve to have a slope $M_g$ at that S value to approximate the $M_d$ slope within a factor of about two.

9. The method of claim 8, further including the step of varying the prime mover speed S to maximize the efficiency of the generator.

10. The method of claim 8, further including the step of operating the generator without field excitation.

11. The method of claim 8, further including the step of also selecting the generator to provide appreciable electrical output of more than about 5% of peak power only above a preselected minimum value of speed S.

12. A method for generating electrical power in a hybrid electric vehicle, comprising the steps of:

(a) providing a prime mover having an output shaft rotating at a speed S determining a prime mover output-power-versus-speed curve having at each value of speed S an output-power/S slope $M_d$;

(b) providing a generator developing electrical power responsive to rotation of the output shaft; and (c) selecting a generator impedance to cause a generator output-power-versus-speed curve to have a slope $M_g$ at that S value to approximate the $M_d$ slope within a factor of about two.

13. The method of claim 12, further including the step of varying the prime mover speed S to maximize the efficiency of the generator.

14. The method of claim 12, further including the step of operating the generator without field excitation.

15. The method of claim 12, further including the step of also selecting the generator to provide an appreciable electrical output of more than about 5% of peak power, only above a preselected minimum value of speed S.

16. The method of claim 12, further including the steps of:
   selecting the prime mover to be a diesel engine;
   selecting the generator to be an AC generator having an input shaft;
   and directly connecting the engine output shaft to the generator input shaft.

17. The method of claim 16, further including the steps of:
   operating the generator without field excitation;
   varying the prime mover speed S to maximize the efficiency of the generator;
   and selecting the generator to provide an appreciable electrical output of more than about 5% of peak power, only above a preselected minimum value of speed S.

* * * * *